(12) United States Patent
Chi et al.

(10) Patent No.: US 8,776,076 B2
(45) Date of Patent: Jul. 8, 2014

(54) HIGHLY SCALABLE COST BASED SLA-AWARE SCHEDULING FOR CLOUD SERVICES

(75) Inventors: Yun Chi, Monte Sereno, CA (US);
Hyun Jin Moon, Newark, CA (US);
Vahit Hakan Hacigumus, San Jose, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 360 days.

(21) Appl. No.: 12/985,038

(22) Filed: Jan. 5, 2011

(65) Prior Publication Data

US 2012/0023501 A1  Jan. 26, 2012

Related U.S. Application Data

(60) Provisional application No. 61/365,972, filed on Jul. 20, 2010.

(51) Int. Cl.
*G06F 9/46* (2006.01)
*G06F 15/173* (2006.01)
*G06Q 50/10* (2012.01)
*G06Q 30/02* (2012.01)
*G06Q 10/06* (2012.01)

(52) U.S. Cl.
CPC .......... *G06Q 50/10* (2013.01); *G06Q 30/0283* (2013.01); *G06Q 10/0631* (2013.01)
USPC .......... 718/105; 718/102; 718/103; 709/223; 709/224

(58) Field of Classification Search
CPC  G06Q 50/10; G06Q 30/0283; G06Q 10/0631

USPC .......... 718/102, 103; 709/223, 224
See application file for complete search history.

(56) References Cited

U.S. PATENT DOCUMENTS

| | | | | |
|---|---|---|---|---|
| 7,668,741 | B2* | 2/2010 | Ernest et al. | 705/7.11 |
| 7,685,599 | B2* | 3/2010 | Kanai et al. | 718/104 |
| 8,260,840 | B1* | 9/2012 | Sirota et al. | 709/201 |
| 2002/0073129 | A1* | 6/2002 | Wang et al. | 709/102 |
| 2006/0117317 | A1* | 6/2006 | Crawford et al. | 718/104 |
| 2008/0320482 | A1* | 12/2008 | Dawson et al. | 718/104 |
| 2009/0222319 | A1* | 9/2009 | Cao et al. | 705/10 |
| 2010/0094828 | A1* | 4/2010 | Mehta et al. | 707/705 |

OTHER PUBLICATIONS

J. M. Peha and F. A. Tobagi. A cost-based scheduling algorithm to support integrated services. In INFOCOM, pp. 741-753, 1991.

J. M. Peha and F. A. Tobagi. Cost-based scheduling and dropping algorithms to support integrated services. IEEE Transactions on Communications, 44(2):192-202, 1996.

* cited by examiner

*Primary Examiner* — Abdullah Al Kawsar
*Assistant Examiner* — Abu Ghaffari
(74) *Attorney, Agent, or Firm* — Joseph Kolodka

(57) ABSTRACT

An efficient cost-based scheduling method called incremental cost-based scheduling, iCBS, maps each job, based on its arrival time and SLA function, to a fixed point in the dual space of linear functions. Due to this mapping, in the dual space, the job will not change their locations over time. Instead, at the time of selecting the next job with the highest priority to execute, a line with appropriate angle in the query space is used to locate the current job with the highest CBS score in logarithmic time. Because only those points that are located on the convex hull in the dual space can be chosen, a dynamic convex hull maintaining method incrementally maintains the job with the highest CBS score over time.

12 Claims, 7 Drawing Sheets

US 8,776,076 B2

HIGHLY SCALABLE COST BASED SLA-AWARE SCHEDULING FOR CLOUD SERVICES

The present application claims priority to Provisional Application Ser. No. 61/365,972 filed Jul. 20, 2010, the content of which is incorporated by reference.

BACKGROUND

The present invention relates to service level agreement-aware scheduling for cloud services.

In the cloud computing environment, service providers offer vast IT resources to large set of customers with diverse service requirements. The service providers leverage the customer volume to achieve the economies of scale to become profitable, which is the key for success. The profit of the service provider is essentially the difference between the revenue and the operational costs. The revenue is defined as the price the customer pays to the provider for the service and the operational cost is the total cost of all resources that the service provider needs to use to operate. The price is defined in the contract between the service provider and the customer and it is typically tied to specific service level agreements (SLAs).

Typically a cloud service delivery infrastructure is used to deliver services to diverse set of clients by sharing the infrastructure resources among them. Each client signs a specific contract with the cloud service provider. The contract defines the agreed upon service fees for the client. The client agrees to pay certain price for specific levels of the service that is provided by the provider. It is very common that such service contract, or SLAs, are in the form of a piecewise linear function. Given the SLAs, the cloud service provider may arrange the order of job execution based on the priorities of the jobs in a way to gain the maximal expected profit. Such priorities should be quickly computed in order to meet the real-time requirement in practice.

An SLA is a contract between a service provider and its customers and indicates the level of service agreed upon as well as associated revenue gain or loss. SLAs can be about many aspects of a cloud computing service such as availability, security, response time, among others. FIG. 1 shows two examples of SLAs in terms of query response time vs. profit of the service provider. FIG. 1(a) shows a staircase-shaped SLA where the service provider has a profit gain of $g_1$ if the query response time is earlier than $t_1$, $g_2$ if the query response time is between $t_1$ and $t_2$, and the service provider has to pay a penalty of $p_1$ if the query response time is greater than $t_2$. Such a staircase-shaped SLA is commonly used in business because they can be easily described by a few "if-clauses" in a contract. FIG. 1(b) shows another SLA, which is commonly used for job scheduling in grid computing: a profit gain $g_1$ is obtained if the query response time is early than $t_1$; if the response time is between $t_1$ and $t_2$, the profit decreases in a linear fashion and becomes negative after certain point; however, the penalty remains fixed at $p_1$ after $t_2$ because for example the customer may use $t_2$ to trigger a time-out and to resubmit the query.

Although there is a mapping between system-level metrics and costs through SLAs, the system-level performance can be dramatically different from the cost performance. For example, assuming a service provider offers services to two customers, a gold customer and a silver customer, by using a shared database server. Because the customers have different SLAs, simply from the distribution of query response time for all the queries, we are not able to tell how well the performance is in terms of cost, because the latter depends on other factors such as the shape of the SLAs from the gold and silver customers, the workload ratios between the two customers, how the scheduling priority is determined, and so on.

The SLA can also be expressed as a function $f(t)$ where t is the response time of a query and $f(t)$ is the corresponding cost if the response time is t. In a piecewise linear SLA, the function $f(t)$ can be divided into finite segments along the time line and in each segment, $f(t)$ is a function linear in t.

FIG. 2 shows several examples of piecewise linear SLAs. In the figure, the x-axis represents query response time, i.e., time when the query is answered with respect to the time that the query arrives at the system (for easy illustration, we assume the query arrives to the system at time 0); the y-axis represents the cost corresponding to different response time t. We discuss these cases in detail.

FIG. 2(a) describes an SLA with a linearly increasing cost versus the response time. That is, the cost is proportional to the response time. Such an SLA reflects a target of weighted mean response time. A moment of thought will reveal that under such SLAs, minimizing the total cost among all the queries is equivalent to minimizing the weighed response time of all queries where the weight for each query is proportional to the slope of its linearly increasing SLA.

FIG. 2(b) describes an SLA in the form of a step function, where the cost is $c_0$ if the response time is less than $t_1$ and $c_1$ otherwise. As a special case, when $c_0=0$ and $c_1=1$ for all queries, the average cost under such an SLA is equivalent to the fraction of queries that miss their (sole) deadlines. It is worth noting that in this case, and in all other cases in the figure, the parameters such as $c_0$, $c_1$, and $t_1$ can be different for each individual query. That is, each query can name its own deadline and corresponding cost for missing that deadline.

FIG. 2(c) describes a staircase-shaped SLA. The cost is $c_0$ if the response time is less than $t_1$, $c_1$ if the response time is between $t_1$ and $t_2$, and so on. Finally, the cost becomes a fixed value ($c_2$ in this example) after the last deadline ($t_2$ in this example). Such an SLA can be used to capture multiple semantics simultaneously. For example, when checking out a shopping cart at an online ecommerce site, a response time less than $t_1$ may result in good user experience whereas a response time longer than $t_2$ may reflect certain unacceptable performance.

FIG. 2(d) describes the mixture of a step function and a linear function. That is, the cost remains constant up to a response time $t_1$ and then grows linearly afterward. This SLA allows a grace period, up to $t_1$, after which the cost grows linearly over time. This example also illustrates that in general, SLAs may contain cost "jumps" (at time $t_1$ in this example) in the cost functions.

FIG. 2(e) describes another way of mixing the step and linear functions. The cost initially grows linearly, but after time $t_1$, it becomes a constant. This SLA captures, for example, the concept of a proportional cost with a time-out, i.e., after $t_1$, the damage has been done and so the cost has reached its maximal penalty value.

FIG. 2(f) describes a piecewise linear SLA in the most general form. That is, the slope at each time segment can be different and there can be cost jumps between consecutive segments in the SLA. It is worth mentioning that although not strictly required by CBS, in practice the SLA functions are usually monotonic, i.e., longer response time is never preferred over shorter response time.

In a database service provisioning setting, data management capabilities are offered as a service in the cloud. In this setting the database systems may receive very large volume of queries from diverse set of customers who share the system resources and have varying price levels captured in the SLAs. Then, it is critical for the service provider to prioritize and schedule the queries in the system in way that the total profit is maximized.

Conventional solutions in this area mainly rely on techniques that do not primarily consider profit maximization. These techniques mainly focus on optimizing more primitive metrics such as average response time. Therefore they cannot optimize profits. Also, almost all prior art considers continuous cost functions rather than discrete levels of costs corresponding to varying levels of service, which is not realistic in many real-life systems.

Cost-Based Scheduling (CBS) does consider cost, but this technique is prohibitively high in computational complexity to be feasible for high volume and large infrastructures. In CBS, each query has its cost function, which decides its query cost given the query response time. The query response time is the time between when a query arrives at the system and when the query answer is returned by the system.

U.S. application Ser. No. 12/818,528, filed by the inventors of the present application and commonly owned, discussed techniques that can efficiently handle a special case of piecewise linear SLAs-SLAs with staircase shapes.

SUMMARY

In one aspect, an incremental cost-based scheduling (iCBS) of cloud services enable service providers to offer differentiated services based on expected costs. The system maps each job, based on its arrival time and SLA function, to a fixed point in the dual space of linear functions. Due to this mapping in the dual space, the jobs will not change their locations over time. Instead, at the time of selecting the next job with the highest priority to execute, a line with appropriate angle in the query space is used to locate the current job with the highest CBS score in logarithmic time. Because only those points that are located on the convex hull in the dual space can be chosen, a dynamic convex hull maintaining process is used to incrementally maintain the job with the highest CBS score over time.

Advantages of the preferred embodiments may include one or more of the following. The system provides a very efficient job prioritization for diverse pricing agreements across diverse clients and heterogeneous infrastructure resources. In cloud computing infrastructures, the system enables profit optimization, which is a vital economic indicator for sustainability. The scheduling process is highly scalable and designed for cloud services. The process has a competitive time complexity of $O(\log^2 N)$ whereas the original implementation of CBS has $O(N)$ time complexity which is prohibitive in a cloud computing system with potentially hundreds or thousands of queries waiting in the queue during the system overload. Logarithmic time complexity makes the use of job prioritization method feasible in large cloud deployments. The iCBS time complexity of $O(\log^2 N)$ is achieved by using certain techniques in computational geometry, and so it makes the cost based scheduling feasible for query scheduling in the cloud-based systems. The system can handle wide range of families of SLA functions. The system is optimal for piecewise linear SLAs, which are easy to describe in natural language and so are preferred for business contracts. Furthermore, they can capture a variety of rich semantics that are either at system-level or business-oriented, such as weighted response time, hard query deadlines, user experiences, among others.

DESCRIPTION

Figure 3:
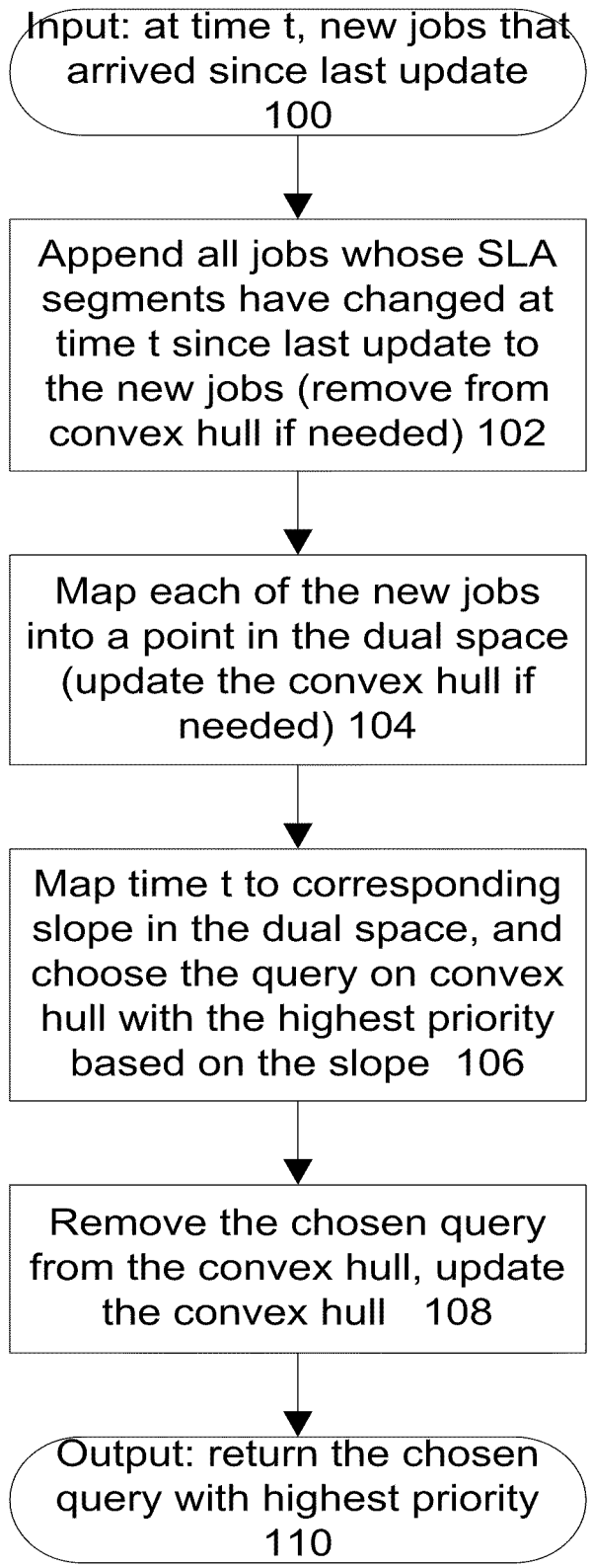
FIG. 3 shows an incremental CBS method.

FIG. 3 shows an incremental CBS method, which has high performance among cost-based techniques. In general the CBS scores are not order preserving and their orders are different depending on the time t when the system inquires about the order. Such a property poses difficulties in an incremental version of CBS in the time space. Because of such difficulties, the dual space of linear functions is used in an incremental cost-based scheduling (iCBS) shown in FIG. 3.

The iCBS method modifies the CBS method as follows. For the CBS score $f(t)=\alpha+\beta e^{at}$, a new variable $\xi=e^{at}$ is applied to get $$f(\xi)=\alpha+\beta\xi,$$

where is time-varying whereas $\alpha$ and $\beta$ are constants. There is a one-to-one mapping between $\xi$ and t. Then, each of these score functions into the dual space of linear functions. That is, each function $f(\xi)=\alpha+\beta\xi$ is mapped to a point $(\alpha, \beta)$ in the dual space.

Next, to determine the order among CBS scores, with $\xi'=e^{at'}$, at time t', the system locates the query that maximizes $f(\xi')=\alpha+\beta\xi'$. At time t', $\xi'$ can be considered as a constant. If $\alpha$ and $\beta$ are variables, then in the dual space, those points ($\alpha$, $\beta$) such that $f(\xi')=\alpha+\beta\xi'=c$, are on an affine line $\alpha=c-\xi'\beta$. As a result, at a given time t', here is a way we can get the point in the dual space that corresponds to the query with the highest CBS score at time t'. The system gets $\xi'=e^{at'}$, construct an affine line with slope $-\xi'$, and the starting from the upper-right corner of the dual space, we move the affine line toward the lower-left corner of the dual space while keeping the slope remained at $-\xi'$. The first point hit by the moving affine line will be the query that has the highest CBS score at time t'. In summary, the advantage of this dual space approach is that in the dual space, the ($\alpha$, $\beta$) location of each query is flexed as time-invariant, whereas over the time, the slope of the inquiry affine line is changed to select the query with the highest CBS score at any given moment.

Figure 1:
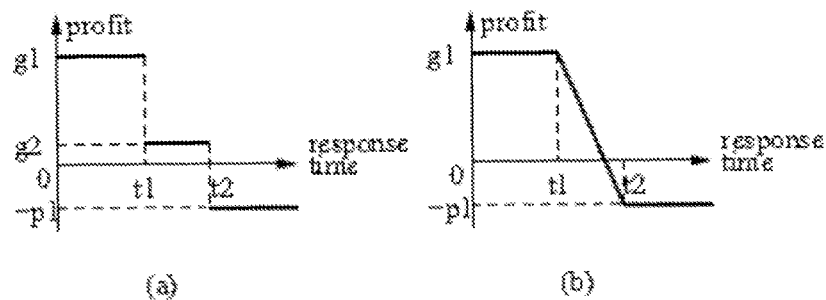
FIG. 1 shows two examples of SLAs in terms of query response time vs. profit of the service provider.
Figure 2:
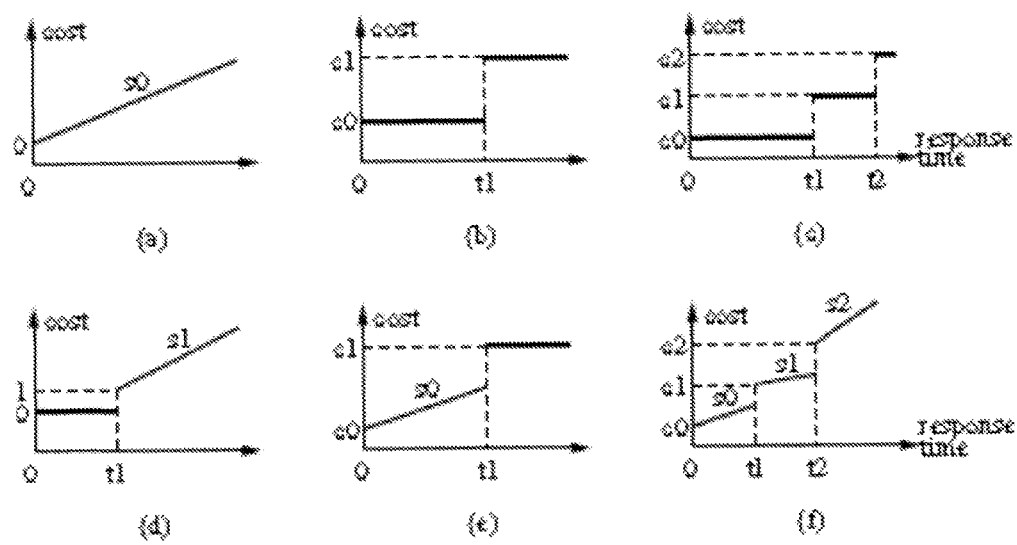
FIGS. 2A-2F show examples of representative piecewise linear SLAs.

With the dual-space interpretation, the queries with SLA of FIG. 2A are located in the dual space on the $\alpha$-axis, so no matter when the CBS scores are checked, the best one is always the one with the highest $\alpha$ value. Similarly, the SLAs of FIGS. 2B-2C are all on the $\beta$-axis in the dual space. In this case, no matter using what slope, the affine line always hits the one with the highest $\beta$ value. All these clearly illustrate that for cases of SLAs in FIGS. 2A-2D, the CBS scores are order-preserving over time, and so they are easy to handle.

Under the general piecewise linear SLAs, each query can be mapped to a point ($\alpha$, $\beta$) in the dual space. At any given moment t, the point in the dual space (and hence the corresponding query) can be determined that currently has the highest CBS score by using an affine line in the dual space with an appropriate slope. The incremental CBS under general piecewise linear SLAs takes advantages of this dual-space view.

A necessary condition for a point q to be hit first by the inquiry affine line is that q is on the (upper) convex hull of all points in the dual space. Thus, the system can skip potentially many points in the dual space that are not on the convex hull when choosing the one with the highest CBS score. Additionally, if the convex hull is maintained properly, finding the point hit first by the an affine line of slope $-\xi$ (i.e., at any time t) can be done in O(log M) time, where M is the number of points on the convex hull. More specifically, if the points of the convex hull are sorted by their $\beta$ values, then the angles of the edges on the convex hull are in an monotonically decreasing order. At time t, the slope $-\xi$ is fixed, and the condition for q on the convex hull to be the point hit first by affine line of slope $-\xi$ is that the slope $-\xi$ is between the angles of the two edges that incident to q. This can easily be done by a binary search.

Under piecewise linear SLAs, in the dual space, a query q is either in a $\alpha$-stage, or $\beta$-stage, or $\alpha\beta$-stage. As used herein, $\alpha$-stage occurs when $\beta=0$ in the CBS score of the query, the $\beta$-stage occurs when $\alpha=0$ in the CBS score of the query, and the $\alpha\beta$-stage occurs when $\alpha<>0$ and $\beta<>0$ in the CBS score of the query. Moreover, the stage of q does not change within the same segment of the piecewise linear SLA of q. With such a property, a query q can only change its stage (and hence its position in the dual space) for finite number of times, where the number is bounded by the number of segments in q's piecewise linear SLA. The system can use an incremental CBS as long as it can (1) efficiently detects when a query changes its segment in its SLA and (2) incrementally maintains a convex hull that supports adding and deleting points dynamically. For item (1), as discussed before, a priority queue of queries can be ordered by the time of the expiration of the current SLA segment. At any time t, we can quickly locate those queries whose current SLA segments have expired before t and update their new stages, new current SLA segments, and new expiration time of the current SLA segments. For item (2), a dynamic convex hull method for finite points in a 2-D plane is used that has $O(\log^2 N)$ time complexity.

FIG. 3 shows an exemplary method that makes decisions based on the cost functions for prioritization and scheduling of the jobs submitted by the clients of a cloud-based system. The method updates and maintains internal data structure at the time of picking the next job to execute. The method receives as input at time t new jobs that arrived since the last update (100). Next, the method appends all jobs whose SLA segments have changed at time t since last update to the new jobs (102). The job is also removed from convex hull if needed in 102. Each of the new jobs is mapped into a point in the dual space, and the convex hull is updated if needed (104). The method then maps time t to a corresponding slope in a dual space, and the query is chosen on the convex hull with the highest priority based on the slope (106). The method then removes the chosen query from the convex hul and updates the convex hull (108). The method returns the chosen query with highest priority (110). The method of FIG. 3 efficiently determines CBS scores of queries with piecewise linear SLAs. This approach, by applying a decomposition of piecewise linear SLAs and by using rules in calculus, avoids the expensive integration in the computation of CBS scores.

Figure 4:
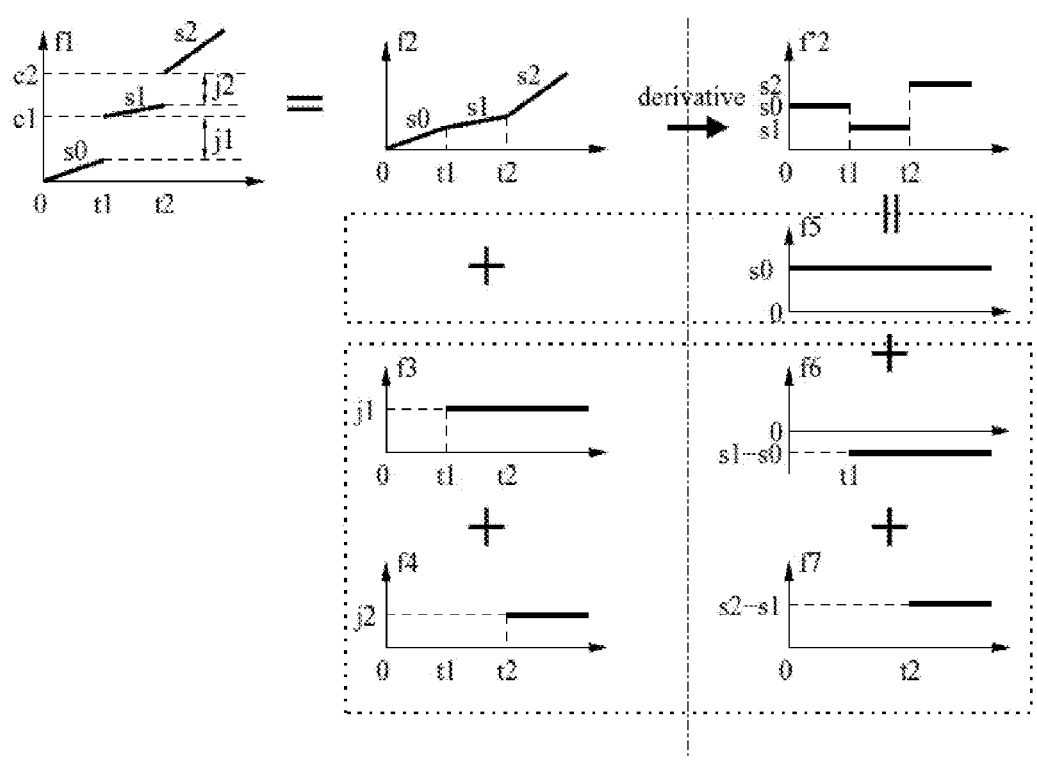
FIG. 4 shows an exemplary decomposition process.

More details of the decomposition operation 106 are pictorially shown in FIG. 4. In 106, the mapping a job into a point in the dual space is based on a decomposition of a piecewise linear SLA. The decomposition is illustrated by using the SLA described in FIG. 2F, which is reproduced on the left in FIG. 4 as $f_1$. As shown in FIG. 4, the SLA can be partitioned into three segments: that before $t_1$, that between $t_1$ and $t_2$, and that after $t_2$. In FIG. 4, the decomposition of a general piecewise linear SLA $f_1$ into the sum of $f_2$, $f_3$, and $f_4$, whereas $f_2'$, the derivative of $f_2$, is further decomposed into the sum of $f_5$, $f_6$, and $f_7$.

Starting from $f_1$, the system decomposes the SLA into the sum of $f_2$, which is a continuous function, and $f_3$ and $f_4$, which are step functions that capture the jumps in the costs of the SLA. Next, the derivative of $f_2$ is taken to get $f_2'$, which in turn can be decomposed into the sum of $f_5$, which is a constant function corresponding to the initial slope of the SLA, and $f_6$ and $f_7$, which are step functions that capture the jumps in the slopes of the SLA.

When SLAs are piecewise linear, the system can efficiently compute CBS scores at any time t by evaluating the exponential values at the places where SLA segments change, without really conducting any integration. The decomposition results in a priority score at time t to be $$r(t) = \frac{1}{a}s_0 + \left(j_1 + \frac{s_1 - s_0}{a}\right)e^{-a(t_1-t)} + \left(j_2 + \frac{s_2 - s_1}{a}\right)e^{-a(t_2-t)}$$

which can be simplified as $$r(t) = \alpha + \beta e^t$$

Figure 5A:
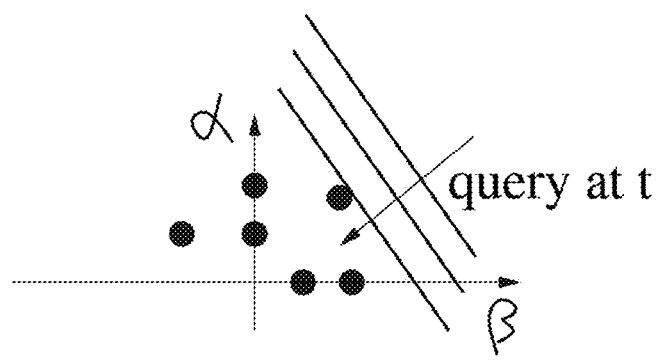
FIG. 5A-5B show exemplary mappings of queries onto a convex hull in a dual space.
Figure 5B:
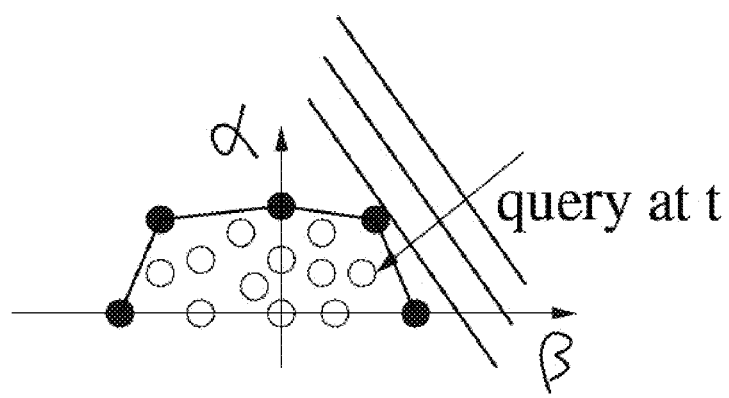

The query with this time-varying score can be mapped to a time-invariant point in the dual space as illustrated in FIG. 5A. After the mapping to the dual space, as shown in FIG. 5A, the process can map an inquiry at time t to a line in the dual space with appropriate slope. As shown in FIG. 5B, at any time t, the query with the highest priority must be located on the convex hull in the dual space.

The iCBS method enables cloud service providers to offer differentiated services based on expected costs. The system maps each job, based on its arrival time and SLA function, to a fixed point in the dual space of linear functions. Due to this mapping in the dual space, the jobs will not change their locations over time. Instead, at the time of selecting the next job with the highest priority to execute, a line with appropriate angle in the query space is used to locate the current job with the highest CBS score in logarithmic time. Because only those points that are located on the convex hull in the dual space can be chosen, a dynamic convex hull maintaining process is used to incrementally maintain the job with the highest CBS score over time. Logarithmic time complexity makes the use of job prioritization method feasible in large cloud deployments.

Figure 6:
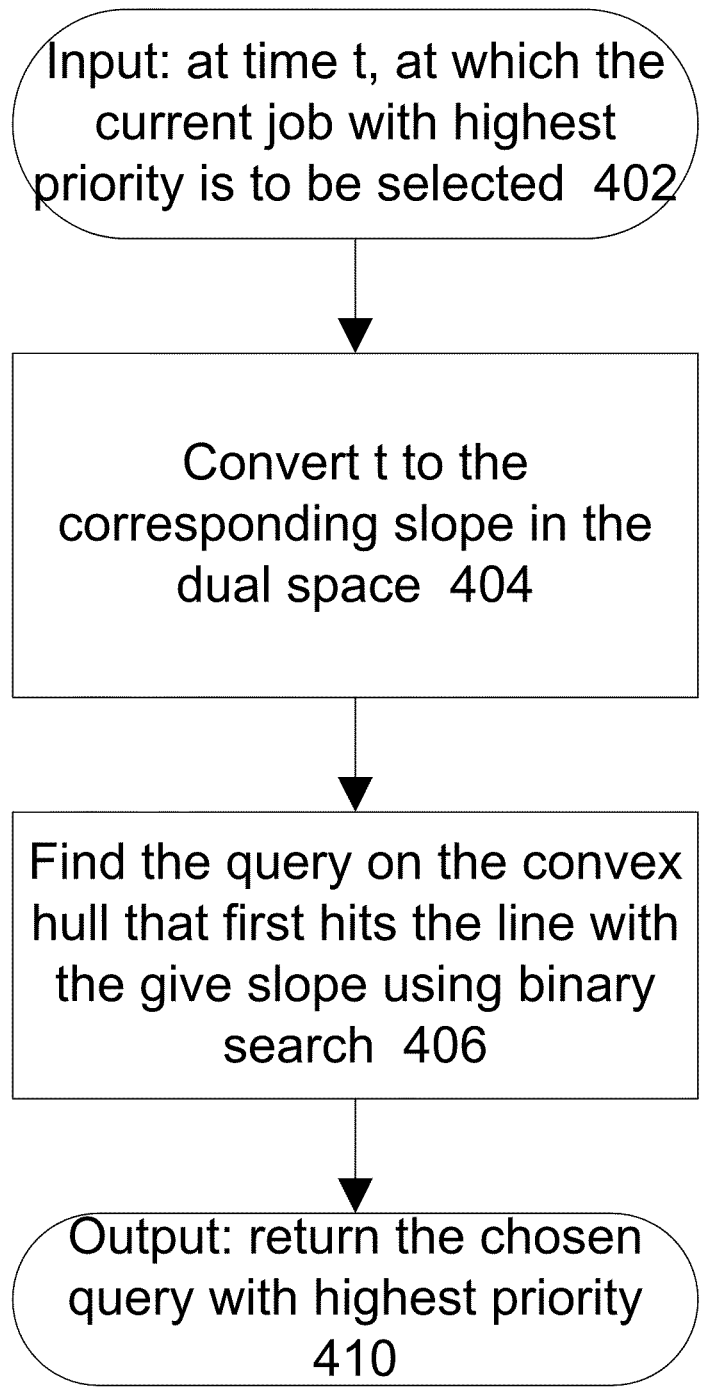
FIG. 6 shows an exemplary process for selecting the query with the highest priority.

The process of selecting the query with the highest priority is described in more details in the flow chart of FIG. 6. The input to the process of FIG. 6 includes the current job with highest priority at time t (402). The process converts t to the corresponding slope in the dual space (404). Next, the process finds the query on the convex hull that first hits the line with the give slope using binary search (406). The chosen query with the highest priority is returned (410).

Figure 7:
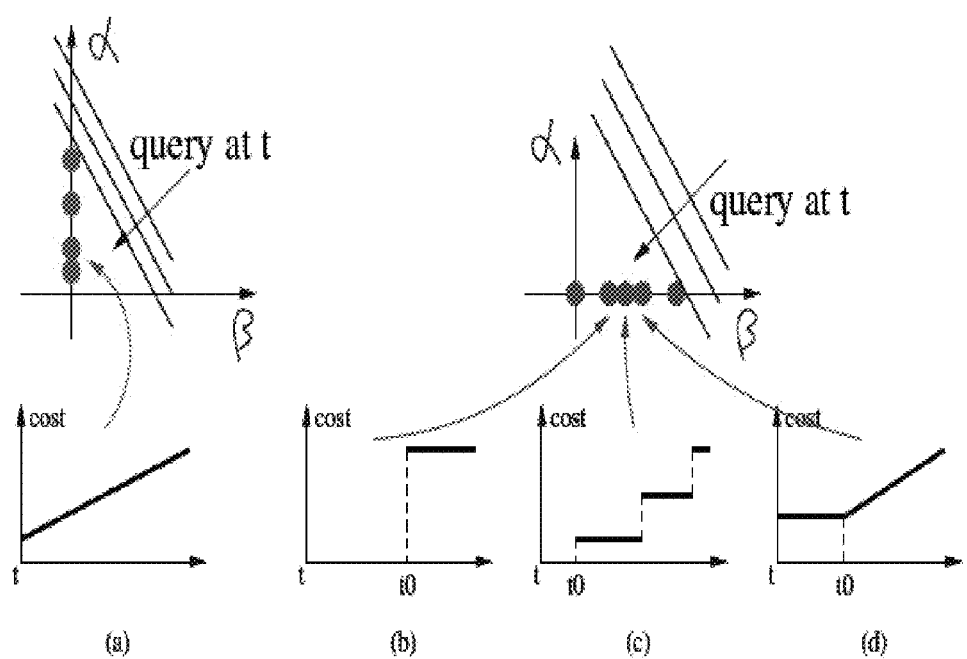
FIG. 7 shows exemplary query mapping using separate data structures.

For even better efficiency, the system can maintain queries with special piecewise linear SLAs (and therefore are mapped to the x-axis and y-axis in the dual space) by using separate data structures. This is because their relative priority remain the same no matter when an inquiry is run, as shown in FIG. 7.

The pseudo code for the iCBS method is shown below.

| Algorithm scheduleNext(t,newQ) |
| --- |
| ▷ input: time t, newly arrived queries newQ |
| ▷ output: q, the next query to execute |
| 1:   call update(t,newQ); |
| 2:   $\xi \leftarrow e^{at}$; |
| 3:   $q_\alpha \leftarrow \alpha\text{-}Q.\text{top}(\ )$; |
| 4:   $q_\beta \leftarrow \beta\text{-}Q.\text{top}(\ )$; |
| 5:   $q_{\alpha\beta} \leftarrow CH.\text{get}(-\xi)$; |
| 6:   if $q_\alpha$ has the highest CBS score |
| 7:      $q \leftarrow \alpha\text{-}Q.\text{pop}(\ )$; |
| 8:   else if $q_\beta$ has the highest CBS score |
| 9:      $q \leftarrow \beta\text{-}Q.\text{pop}(\ )$; |
| 10:     remove $q_\beta$ from a-Q; |
| 11:  else |
| 12:     $q \leftarrow q_{\alpha\beta}$; |
| 13:     remove $q_{\alpha\beta}$ from $\alpha\beta$-Q, CH, and a-Q; |
| 14:  return q; |

| Algorithm update(t,newQ) |
| --- |
| ▷ input: time t, newly arrived queries newQ |
| ▷ a-Q: priority queue on expiration time ($\epsilon$) |
| ▷ $\alpha$-Q: priority queue for queries in $\alpha$-stage |
| ▷ $\beta$-Q: priority queue for queries in $\beta$-stage |
| ▷ $\alpha\beta$-Q: priority queue for queries in $\alpha\beta$-stage |
| ▷ CH: convex hull for queries in $\alpha\beta$-stage |
| ▷ First, handle queries that change SLA sections |
| 1:   foreach q in a-Q such that $q.\epsilon < t$ do |
| 2:      remove q from a-Q; |
| 3:      append q to the end of newQ; |
| 4:      if q was in $\beta$-Q |
| 5:         remove q from $\beta$-Q; |
| 6:      else if q was in $\alpha\beta$-Q |
| 7:         remove q from $\alpha\beta$-Q and CH; |
| ▷ Second, (re)insert updated queries |
| 8:   foreach q in newQ do |
| 9:      compute q's $\alpha$, $\beta$, $\epsilon$ values; |
| 10:     if q is in $\alpha$-stage |
| 11:        insert q to $\alpha$-Q; |
| 12:     else if q is in $\beta$-stage |
| 13:        insert q to $\beta$-Q and a-Q; |
| 14:     else /* q is in $\alpha\beta$-stage */ |
| 15:        insert q to $\alpha\beta$-Q, CH, and a-Q; |

At each time t of scheduling the next query to execute, algorithm scheduleNext( ) is called with t, the current time stamp, and newQ, those queries that have arrived before t but after the last time when scheduleNext( ) was called. In the first step of scheduleNext( ) algorithm update( ) is called in order to incrementally update the internal data structures.

The internal data structures maintained by iCBS include (1) a-Q: a priority query containing queries either in $\beta$-stage or in $\alpha\beta$-stage, where for each query q in a-Q, its priority is the q.$\epsilon$, the time when the current SLA segment of q will expire, (2) $\alpha$-Q, $\beta$-Q, and $\alpha\beta$-Q: priority queues for those queries in $\alpha$-stage, $\beta$-stage, and $\alpha\beta$-stage, respectively, and (3) CH: the convex hull in the dual space for all the queries in $\alpha\beta$-stage.

When update( ) is called, it first detects those queries whose current SLA segments have expired before t (line 1). For these queries, their $\alpha$ and $\beta$ values (as well as stages) may have changed since last time update( ) was called. So these queries are removed from the corresponding internal data structures and these queries are appended to the end of newQ so that their $\alpha$ and $\beta$ values will be recomputed (lines 2-7). Then for all the queries in newQ (both those newly arrived and those that need updates), their $\alpha$ and $\beta$ values are computed, their stages are determined, their new current SLA segments and expiration time are updated, and they are inserted into the corresponding data structures.

After the internal data structures have been updated, scheduleNext( ) checks $q_\alpha$, $q_\beta$, and $q_{\alpha\beta}$, the three queries that have the highest CBS scores in the $\alpha$-Q, $\beta$-Q, and $\alpha\beta$-Q. To get $q_\alpha$ and $q_\beta$, it is suffice to peek at the tops of $\alpha$-Q and $\beta$-Q; to get $q_{\alpha\beta}$, it is suffice to do a binary search on the convex hull CH by using the slope $-\xi = -e^{at}$. Then the best one among $q_\alpha$, $q_\beta$, and $q_{\alpha\beta}$ is selected and removed from the corresponding data structures (assuming this query is actually executed next).

The system implements CBS in a more efficient way, in the special case where the cost is determined on query response time by using piecewise linear SLAs. With piecewise linear SLAs, the expensive integrations in the original CBS can be completely avoided. Next, to reduce the number of CBS scores computed at each time of scheduling, the incremental version of CBS, iCBS, can handle many special types of piecewise linear SLAs with an O(log N) time complexity, and handle arbitrary piecewise linear SLAs with an O(log² N) time complexity, by using a dynamic convex hull method. Experimental results demonstrate that (1) CBS has better performance in comparison with several state-of-the-art cost-based solutions and (2) iCBS, the incremental version, has quick computation time.

Figure 8:
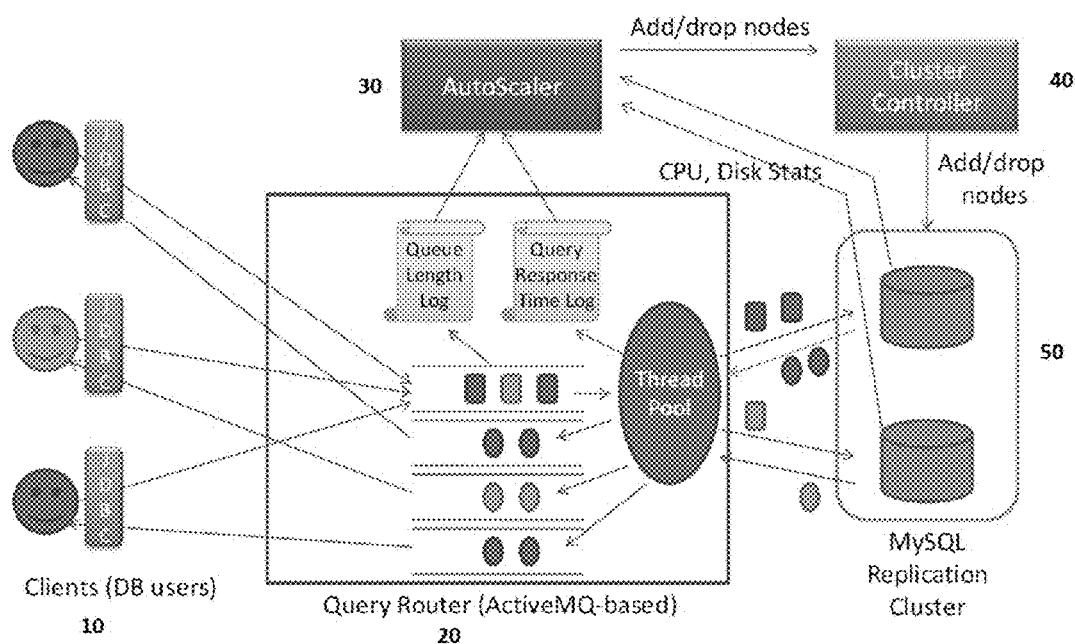
FIG. 8 shows an exemplary system for scheduling systems resource to maximize the expected profit for a service provider in cloud computing.

FIG. 8 shows an exemplary system to manage large cloud service delivery infrastructures. The system architecture focuses on components that are relevant and subject to optimization to achieve the goal of SLA-based profit optimization of resource and workload management in the cloud databases. The use of distinctively optimizing individual system components with a global objective in mind provides a greater degree of freedom to customize operations. This approach yielded higher degrees of performance, customizability based on variable business requirements, and end-to-end profit optimization.

In one embodiment, clients 10 communicate with a query router 20. An autoscaler 30 monitors the queue length log and query response time log and determines if additional nodes should be added by an add/drop controller 40. The controller issues commands to add/drop nodes to a database replication cluster 50 such as a MySQL replication cluster. Although the system of FIG. 8 shows specific product names, such as MySQL and Active MQ, for example, the system is not limited to those products. For example MySQL can be replaced with other database products such as Oracle, among others.

The system has a Client Data Module that is responsible for maintaining client specific data such as cost functions and SLAs, which are derived from client contracts. Once captured, this information is made available to other system modules for resource and workload management purposes. An Manager monitors the status of system, e.g. system load, queue lengths, query response time, CPU and I/O utilization. All this information is maintained by the System Data module. Based on system monitoring data the Manager directs the Cluster Manager to add or remove servers from/to Resource Pool to optimize the operational cost while keeping the SLA costs in check. The Manager also provides the dispatcher and scheduler modules with the dynamic system data. An Online Simulator is responsible for dynamic capacity planning. It processes the client data and dynamic system data to assess optimum capacity levels through simulation. It has capabilities to run simulations both in offline and online modes. A Dispatcher takes incoming client calls and immediately forwards the queries (or jobs) to servers based on the optimized dispatching policy. The dispatching policy is constantly tuned according to dynamic changes in the system, such as user traffic, addition/removal of processing nodes. A Scheduler decides the order of execution of jobs at each server. After the client requests are dispatched to individual servers based on the dispatching policy, individual scheduler modules are responsible for prioritization of dispatched jobs locally by forming a queue of queries, from which a query is chosen and executed in the database. The choice of which query to execute first makes a difference in the SLA penalty costs observed.

The system uses an SLA-based profit optimization approach for building and managing a data management platform in the cloud. The problem of resource and workload management is done for a data management platform that is hosted on an Infrastructure-as-a-Service (IaaS) offering, e.g., Amazon EC2. The data management platform can be thought of as a Platform-as-a-Service (PaaS) offering that is used by Software-as-a-Service (SaaS) applications in the cloud.

In the system model, each server node represents a replica of a database. When a query (job) arrives, a dispatcher immediately assigns the query to a server among multiple servers, according to certain dispatching policy; for each server, a resource scheduling policy decides which query to execute first, among those waiting in the associated queue; and a capacity planning component is in charge of determining how many resources (i.e., database servers) to be allocated in the system. With this abstraction, the system optimizes three tasks: query dispatching, resource scheduling, and capacity planning.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a computer with digital signal processing capability to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

The invention claimed is:

1. A method, comprising:
   a. mapping each job based on an arrival time, job priority, and service level agreement (SLA) function, to a fixed point in a dual space of linear functions;
   b. selecting a next job with a highest priority to execute using a line with an angle in the dual space to locate a current job with a highest cost-based scheduling (CBS) score $f(t)=\alpha+\beta e^{at}$, wherein, $\xi=e^{at}$ is applied to get $f(\xi)=\alpha+\beta\xi$, where $\xi$ is time-dependent variable, $\alpha$ and $\beta$ are constants with one-to-one mapping between $\xi$ and t, wherein each function $f(\xi)=\alpha+\beta\xi$ is mapped to a point $(\alpha, \beta)$ in the dual space and determining the CBS score under piecewise linear SLAs with:

$$r(t) = \frac{1}{a}s_0 + \left(j_1 + \frac{s_1 - s_0}{a}\right)e^{-a(t_1-t)} + \left(j_2 + \frac{s_2 - s_1}{a}\right)e^{-a(t_2-t)}$$

wherein r(t) is prioritized cost based scheduling score, a is parameter in the scheduling algorithm, $j_1$, $j_2$ are the height of the jumps between consecutive segments in the piecewise linear SLA function, $s_0$, $s_1$, $s_2$ are the slopes of the segments in the piecewise linear SLA function, $t_1$, $t_2$ are the time when the next segment in the SLA function become effective; and
   c. prioritizing each job for profit maximization in a service delivery infrastructure with the piecewise linear SLA functions; and
   d. running the job with the highest CBS score;
   e. wherein mapping, selecting and running is performed using a processor.

2. The method of claim 1, comprising performing job segmentation based on cost based scheduling functions.

3. The method of claim 2, comprising scheduling jobs in accordance with the job segmentation.

4. The method of claim 1, comprising performing job segmentation and mapping the segmented job to the dual space to incrementally maintain the current job with the highest priority score.

5. The method of claim 1, comprising:
   a. Appending jobs whose SLA segments to new jobs;
   b. Mapping each new job to a point in the dual space;
   c. Mapping time t to a corresponding slope in the dual space;
   d. selecting a query on the convex hull with the highest priority based on the slope; and
   e. Removing the selected query from the convex hull and updating the convex hull.

6. The method of claim 1, wherein mapping the job into a point in the dual space is based on a decomposition of the piece wise linear SLA.

7. The method of claim 1, wherein a time-varying score is mapped to a time-invariant point in the dual space.

8. The method of claim 1, comprising mapping an inquiry at a time t to a line in the dual space with a predetermined slope.

9. The method of claim 1, comprising selecting a query on a convex hull comprises:
   a. At time t, selecting the job with the highest priority;
   b. Convert t to a predetermined slope in the dual space; and
   c. Selecting a query on the convex hull that meets a line with the predetermined slope.

10. A cloud system, comprising:
    a. a processor running code for mapping each job, based on an arrival time, job priority, and service level agreement (SLA) function, to a fixed point in a dual space of linear functions;
    b. code for selecting a next job with a highest priority to execute using a line with an angle in the space to locate a current job with a highest cost-based scheduling (CBS) score $f(t)=\alpha+\beta e^{at}$, wherein $\xi=e^{at}$ is applied to get $f(\xi)=\alpha+\beta\xi$, where $\xi$ is time-dependent variable, $\alpha$ and $\beta$ are constants with one-to-one mapping between $\xi$ and t, wherein each function $f(\xi)=\alpha+\beta\xi$ is mapped to a point $(\alpha, \beta)$ in the dual space and determining the CBS score under piecewise linear SLAs with:

$$r(t) = \frac{1}{a}s_0 + \left(j_1 + \frac{s_1 - s_0}{a}\right)e^{-a(t_1-t)} + \left(j_2 + \frac{s_2 - s_1}{a}\right)e^{-a(t_2-t)}$$

wherein r(t) is prioritized cost based scheduling score, a is parameter in the scheduling algorithm, $j_1$, $j_2$ are the height of the jumps between consecutive segments in the piecewise linear SLA function, $s_0$, $s_1$, $s_2$ are the slopes of the segments in the piecewise linear SLA function, $t_1$, $t_2$ are the time when the next segment in the SLA function become effective; and c. code for prioritizing the job for profit maximization in a service delivery infrastructures with piecewise linear SLA functions; and
   d. code for running the job with the highest CBS score.

11. The system of claim 10, comprising code for performing job segmentation based on cost functions.

12. The system claim 11, comprising code for scheduling jobs in accordance with the job segmentation.

\* \* \* \* \*